United States Patent
Chen (10) Patent No.: US 8,891,831 B2
(45) Date of Patent: Nov. 18, 2014

(54) METHOD AND APPARATUS FOR CONSERVATIVE MOTION ESTIMATION FROM MULTI-IMAGE SEQUENCES

(75) Inventor: Wei Chen, Potomac, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 440 days.

(21) Appl. No.: 13/324,073

(22) Filed: Dec. 13, 2011

(65) Prior Publication Data
US 2012/0148112 A1 Jun. 14, 2012

Related U.S. Application Data

(60) Provisional application No. 61/422,758, filed on Dec. 14, 2010.

(51) Int. Cl.
G06K 9/00 (2006.01)
H04N 7/01 (2006.01)

(52) U.S. Cl.
CPC .................. H04N 7/0137 (2013.01)
USPC ............ 382/107; 382/103; 348/154; 348/169

(58) Field of Classification Search
CPC .................. H04N 19/00587; H04N 19/00684
USPC ........................................................ 382/107
See application file for complete search history.

(56) References Cited

U.S. PATENT DOCUMENTS

| | | | | |
|---|---|---|---|---|
| 5,241,608 A * | 8/1993 | Fogel | ............................. | 382/107 |
| 5,600,731 A * | 2/1997 | Sezan et al. | ................... | 382/107 |
| 5,784,114 A * | 7/1998 | Borer et al. | .................... | 348/452 |
| 5,912,815 A * | 6/1999 | Kim et al. | ........................ | 700/33 |
| 6,005,917 A * | 12/1999 | Andersson et al. | ........ | 378/98.12 |
| 6,535,647 B1 * | 3/2003 | Abousleman | ................ | 382/253 |
| 6,539,122 B1 * | 3/2003 | Abousleman | ................ | 382/240 |
| 6,804,400 B1 * | 10/2004 | Sharp | ............................ | 382/239 |
| 7,667,778 B2 * | 2/2010 | Yoshiwara | ................... | 348/699 |
| 8,432,974 B2 * | 4/2013 | Chen | ........................... | 375/240.19 |
| 8,781,165 B2 * | 7/2014 | Chen | ........................... | 382/103 |
| 2003/0021472 A1* | 1/2003 | Nichogi et al. | .............. | 382/166 |
| 2003/0048944 A1* | 3/2003 | De Bonet | ...................... | 382/166 |
| 2003/0081836 A1* | 5/2003 | Averbuch et al. | ............ | 382/199 |
| 2005/0259738 A1* | 11/2005 | Horishi et al. | ........... | 375/240.16 |
| 2005/0259739 A1* | 11/2005 | Nakamura et al. | ....... | 375/240.16 |
| 2005/0271144 A1* | 12/2005 | Yoshiwara | ............... | 375/240.16 |
| 2006/0269140 A1* | 11/2006 | Ramsay et al. | .............. | 382/191 |
| 2009/0028243 A1* | 1/2009 | Suzuki et al. | ............ | 375/240.15 |
| 2009/0161753 A1* | 6/2009 | Youn et al. | ............... | 375/240.01 |

(Continued)

OTHER PUBLICATIONS

Chen, W., "A Global Optimal Solution with Higher Order Continuity for the Estimation of Surface Velocity from Infrared Images", IEEE Trans. Geosci. Rem. Sens.,vol. 48, No. 4, pp. 1931-1939, (Apr. 2010).

(Continued)

Primary Examiner — Ghandi Thirugnanam
(74) Attorney, Agent, or Firm — US Naval Research Laboratory; Sally A. Ferrett (57) ABSTRACT

Apparatus and methods are presented for estimating the velocity field based on a multi-image frame sequence having an integer number M frames, M is greater than two, in which a set of M−1 displaced frame difference (DFD) equations is solved using a set of iteration equations to determine a velocity field.

12 Claims, 6 Drawing Sheets

(56) References Cited

U.S. PATENT DOCUMENTS

| | | | |
|---|---|---|---|
| 2011/0007819 A1* | 1/2011 | Chen | 375/240.19 |
| 2011/0081050 A1* | 4/2011 | Chen | 382/107 |
| 2012/0147263 A1* | 6/2012 | Chen | 348/452 |
| 2012/0148110 A1* | 6/2012 | Chen | 382/107 |
| 2012/0148111 A1* | 6/2012 | Chen | 382/107 |
| 2012/0148112 A1* | 6/2012 | Chen | 382/107 |
| 2014/0016829 A1* | 1/2014 | Chen | 382/107 |

OTHER PUBLICATIONS

Chen, W.; "The global optimal surface velocity field near shoreline from infrared images", International Symposium on Photoelectronic Detection and Imaging 2009: Advances in Infrared Imaging and Applications, Proc. of SPIE vol. 7383, 738333-1-738333-10, conference dates Jun. 17-19, 2009, published Aug. 4, 2009.

Chen, W., "Surface Velocity Estimation From Satellite Imagery Using Displaced Frame Central Difference Equation", IEEE Trans. Geoscience and Remote Sensing, vol. 50, No. 7, pp. 2791-2801, date of publication Jan. 23, 2012.

Chen, W.; "Nonlinear Inverse Model for Velocity Estimation from an Image Sequence", J. Geophys. Res., vol. 116, pp. C06015-1-C06015-15, Jun. 22, 2011.

Chen, W., "A Nonlinear Model for Velocity Estimation from Infrared Image Sequences", International Archives of the Photogrammetry, Remote Sensing, and Spatial Information Science (ISPRS), Commission VIII, WG VIII/9 ,vol. XXXVIII, Part 8, Kyoto, Japan, pp. 958-963, conference date Aug. 9-12, 2010.

Chen, W., "Conservative Motion Estimation from Multi-image Sequences", ISVC 2010, Proceedings Part I, Lecture Notes in Computer Science 6453, pp. 427-436, symposium date Nov. 29, 2010-Dec. 1, 2010.

Li, H.; Astrid, L.; Robert, F., "Image Sequence Coding at Very Low Bitrates: A Review"; IEEE Trans. Image Processing, vol. 3, No. 5, pp. 589-609, (Sep. 1994).

Stiller, C.; Konrad, J.; "Estimating motion in image sequences: A tutorial on modeling and computation of 2D motion", IEEE Signal Processing Magazine, pp. 70-91, (Jul. 1999).

Dubois, E., "Motion-compensated filtering of time-varying images", Multidimens. Syst. Signal Process, vol. 3, pp. 211-239, (1992).

Orchard M.T.; Sullivan, G.J.; "Overlapped block motion compensation: An estimation-theoretic approach," IEEE Trans. Image Process., vol. 3, No. 5, pp. 693-699, (Sep. 1994).

Castagno, R.; Haavisto, P.; Ramponi, G.; "A method for motion adaptive frame rate up-conversion", IEEE Trans. Circuits Syst. Video Technol., vol. 6, No. 5, pp. 436-446, (Oct. 1996).

Girod, B., "Efficiency analysis of multihypothesis motion-compensatedprediction for video coding," IEEE Trans. Image Process., vol. 9, No. 2, pp. 173-183, (Feb. 2000).

Lee, S.H.; Kwon, O.; Park, R.H.; "Weighted-adaptive motion-compensated frame rate up-conversion," IEEE Trans. Consum. Electron., vol. 49, No. 3, pp. 485-492, (Aug. 2003).

Wedi, T., "Adaptive interpolation filters and high-resolution displacements for video coding", IEEE Trans. Circuits Syst. Video Technol., vol. 16, No. 4, pp. 484-491, (2006).

Gan, Z.; Qi, L.; and Zhu, X.; "Motion compensated frame interpolation based on H.264 decoder," Electron. Lett., vol. 43, No. 1, pp. 96-98, (2007).

Choi, B.D.; Han, J.W.; Kim, C.S.; Ko, S.J.; "Motion-compensated frame interpolation using bilateral motion estimation and adaptive overlapped block motion compensation", IEEE Trans. Circuits Syst. Video Technol., vol. 17, No. 4, pp. 407-416, (2007).

Huang, A.-M.; Nguyen, T.; "A multistage motion vector processing method for motion-compensated frame interpolation," IEEE Trans. Image Process., vol. 17, No. 5, pp. 694-708, (May 2008).

Zhang, Y.; Zhao, D.; Ji, X.; Wang, R.; Gao, W.; "A Spatio-Temporal Auto Regressive Model for Frame Rate Up conversion", IEEE Trans. Circuit Syst., vol. 19, No. 9, pp. 1289-1301, (Sep. 2009).

Zhang, Y.; Zhao, D.; Ma, S.; Wang, R.; and Gao, W.; "A Motion-Aligned Auto-Regressive Model for Frame Rate Up Conversion", IEEE Transactions on Image Processing, vol. 19, No. 5, pp. 1248-1258, (May 2010).

Wang, C.; Zhang, L.; He, Y.; and Tan, Y.-P.; "Frame Rate Up-Conversion Using Trilateral Filtering", IEEE Trans. Circuit Syst., vol. 20, No. 6, pp. 886-893, (Jun. 2010).

Horn, B.; Shunck, B.; "Determining optical flow", Artificial Intelligence, No. 17, pp. 185-203, (Apr. 1980).

Lucas, B. D.; "Generalized image matching by the method of differences", PhD thesis, Carnegie Mellon Univ., (1984).

Bigun, J.; Granlund, G.H.; Wiklund, J.; "Multidimensional orientation estimation with applications to texture analysis and optical flow", IEEE Trans. Pattern Anal. Mach. Intell, (Aug. 1991).

Black, M.J.; Anandan, P.; "The robust estimation of multiple motions: parametric and piecewise smooth flow fields", Computer Vision and Image Understanding, vol. 63, No. 1, pp. 75-104, (1996).

Heitz, F. and Bouthemy, P., "Multimodal estimation of discontinuous optical flow using Markov random fields", IEEE Transactions on Pattern Analysis and Machine Intelligence, vol. 15, No. 12, pp. 1217-1232, (1993).

Nesi, P., "Variational approach to optical flow estimation managing discontinuities", Image and Vision Computing, vol. 11, No. 7, pp. 419-439, (1993).

Weickert, J.; Schnorr, C.; "A theoretical framework for convex regularizers in PDE-based computation of imagemotion", International Journal of Computer Vision, vol. 45, No. 3, pp. 245-264, (2001).

Bruhn, A.; Weickert, J.; Schnorr, C.; "Lucas/Kanade Meets Horn/Schunck: Combining Local and Global Optic Flow Methods", International Journal of Computer Vision, vol. 61, No. 3, pp. 211-231, (2005).

Papenberg, N.; Bruhn, A.; Brox, T.; Didas, S.; Weickert, J.; "Highly Accurate Optic Flow Computation with Theoretically Justified Warping", International Journal of Computer Vision, vol. 67, No. 2, pp. 141-158, (2006).

Glazer, F., et al., "Scene matching by hierarchical correlation," Proc. IEEE Comp. Vision Pattern Recognition Conf., (Washington, DC), DTIC, 10 pages, Jun. 1983.

Ghanbari, H.; Mills, M. ; "Block matching motion estimations: New results," IEEE Trans. Circuit Syst., vol. 37, pp. 649-651, 1990.

Seferidis V.; Ghanbari, M.; "General approach to block-matching motion estimation," Journal of Optical Engineering, vol. 32, pp. 1464-1474, Jul. 1993.

Shi, J.; Tomasi, C.; "Good features to track", Proc. Computer Vision and Pattern Recognition, pp. 593-600, Jun. 1994.

Baker, S.; Scharstein, D.; Lewis, J.P.; Roth, S.; Black, M.J.; Szeliski, R.; "A Database and Evaluation Methodology for Optical Flow", Int J Comput Vis, vol. 92, pp. 1-31, conference date Oct. 2007.

Brox, T.; "Highly Accurate Optic Flow Computation with Theoretically Justified Warping", International Journal of Computer Vision, vol. 67, No. 2, pp. 141-158, (2006).

Robbins, J.D.; Netravali A.N., "Recursive motion compensation: A review", in "Image Sequence processing and Dynamic Scene Analysis", T. S. Huang, ed., pp. 76-103, Berlin, Germany, Springer-Verlag, (1983).

Liu, Y.; Huang, T.S.; "Vehicle-Type Motion Estimation from Multi-frame Images", IEEE Trans. Pattern Anal. Mach. Intell., vol. 15, No. 8, pp. 802-808, (Aug. 1993).

Bergen, J. R.; Burt, P. J.; Hingorani, R.; Peleg, S.; "A three-frame algorithm for estimating two-component image motion", IEEE Trans. Pattern Anal. Mach. Intell., vol. 14, No. 9, pp. 886-896, (Sep. 1992).

Shariat, H.; Price, K.; "Motion estimation with more than two frames", IEEE Trans. Pattern Anal. Mach. Intell., vol. 12. No. 5, pp. 417-434, (May 1990).

Chen, W.; Mied, R.P.; and Shen, C.Y., "Estimation of Surface Velocity from Infrared Image Using the Global Optimal Solution to an Inverse Model", Geoscience and Remote Sensing Symposium, 2008; IGARSS 2008; IEEE International; vol. 1, pp. I-384-I-386, IEEE, 2008.

(56) References Cited

OTHER PUBLICATIONS

Chen, W.; Mied, R. P.; and Shen, C. Y.; "Near-Surface Ocean Velocity from Infrared Images: Global Optimal Solution to an Inverse Model", Journal of Geophysical Research—Oceans, vol. 113, C10003, pp. 1-13, (Oct. 2008).

Emery, W.J.; Thomas, A.C.; Collins, M.J.; Crawford, W.R.; and Mackas, D.L.; "An Objective Method for Computing Advective Surface Velocities from Sequential Infrared Satellite Images", J. Geophys. Res., vol. 91, pp. 12865-12878, (1986).

Kelly, K.A., (1989), "An Inverse Model for Near-Surface Velocity from Infrared Images", J. Phys. Ocean., vol. 19, pp. 1845-1864, (1989).

Kelly, K.A.; and Strub, P.T., Comparison of Velocity Estimates from Advanced Very High-Resolution Radiometer in the Coastal Transition Zone, J. Geophys. Res., vol. 97, pp. 9653-9668, (1992).

Ostrovskii, A., and Piterbarg, L., Inversion for Heat Anomaly Transport from Sea-Surface Temperature Time-Series in the Northwest Pacific, J. Geophys. Res., vol. 100, pp. 4845-4865, (Mar. 1995).

Ostrovskii A.G., and Piterbarg L.I., "Inversion of Upper Ocean Time Series for Entrainment, Advection, and Diffusivity", J. Phys. Ocean., vol. 30, pp. 201-204, (2000).

Vigan, X.; Provost, C.; Bleck, R.; and Courtier, P.; "Sea surface velocities from sea surface temperature image sequences 1. Method and validation using primitive equation model output", J. Geophys. Res., vol. 105, pp. 19499-19514, (2000).

Vigan. X. et al., "Sea Surface Velocities from Sea Surface Temperature Image Sequences 2. Application to the Brazil-Malvinas Confluence Area", J. Geophys. Res., vol. 105, pp. 19515-19534, (2000).

Zavialov, P.O., et al., "An Inverse Model for Seasonal Circulation over the Southern Brazilian Shelf: Near-Surface Velocity from the Heat Budget," J. Phys. Ocean., vol. 28, pp. 545-562, (1998).

Chubb, S.R.; Mied, R.P.; Shen, C.Y.; Chen, W.; Evans, T.E.; and Kohut, J.; "Ocean Surface Currents from AVHRR Imagery: Comparison with Land-based HF Radar Measurements", IEEE Trans. on Geoscience and Remote Sensing, vol. 46, No. 11, pp. 3647-3660, (Nov. 2008).

Frankignoul, C. "Sea surface temperature anomalies, planetary waves, and air-sea feedback in the middle latitudes", J. Geophys. Res., vol. 23, pp. 357-390, (Nov. 1985).

Kundu, P. K., "Ekman veering observed near the ocean bottom", J. Phys. Ocean., vol. 6, pp. 238-242, (1976).

Kohut, J.T.; Glenn, S.M.; and Chant, R.J.; "Seasonal Current Variability on the New Jersey Inner Shelf", J. Geophys. Res.—Oceans, vol. 109, pp. C07S07-1-C07S07-16, (2004).

Press, W.H.; Teukolsky, S.A.; Vetterling, W.T.; and Flannery, B.P.; "Numerical Recipes in C", Cambridge University Press, 2nd Edition, pp. 123-124, (1992).

Shen, C.Y.; and Evans, T.E.; "Inertial instability and sea spirals", Geophys. Res. Lett., vol. 29, No. 23, pp. 39-1-39-4, doi: 10.1029/2002GL015701, (2002).

Shen, C.Y.; Evans, T.E.; Mied, R.P.; and Chubb, S.R.; "A velocity projection framework for inferring shallow water currents from surface tracer fields", "Cont. Shelf Research", vol. 28, pp. 849-864, 2008. (Available online Jan. 26, 2008).

Wentz, F.J.; Gentemann, C.; Smith, D.; and Chelton, D.; "Satellite measurements of sea surface temperature through clouds", Science, vol. 288, pp. 847-850, (May 2000).

Jing Zhang and Guizhong Liu, "An efficient reordering prediction-based lossless compression algorithm for hyperspectral images", Apr. 2007, IEEE Geoscience and Remote Sensing Letters, vol. 4, No. 2, pp. 283-287.

Jing Zhang and Guizhong Liu, "A novel lossless compression for hyperspectral images by adaptive classified arithmetic coding in wavelet domain", 2006, IEEE International Conference on Image Processing (ICIP), pp. 2269-2272.

\* cited by examiner

METHOD AND APPARATUS FOR CONSERVATIVE MOTION ESTIMATION FROM MULTI-IMAGE SEQUENCES

REFERENCE TO RELATED APPLICATION

This application is a non-provisional under 35 USC 119(e) of, and claims priority to and the benefit of U.S. Provisional Patent Application Ser. No. 61/422,758, filed Dec. 14, 2010, the entirety of which is hereby incorporated by reference.

BACKGROUND

The present disclosure relates generally to image processing and more particularly to apparatus and techniques for estimating a velocity field using a sequence of input frames. Computer vision and remote sensing applications often utilize motion field estimation from an image sequence for video coding or other purposes. Conventional velocity estimation techniques include finding a velocity or displacement field using a pair of successive image frames, and existing motion estimation models and algorithms assume that the image intensity recorded from different physical sensors obey a conservation constraint for tracer, heat, or optical flow in space and time. Popular high definition video compression solutions often perform velocity estimation using a block matching algorithm (BMA) in which all pixels of a given block or tile are assumed to be at a constant velocity vector. However, such an assumed velocity field is not continuous at the boundaries between adjacent blocks, leading to poor video reproduction results. Accordingly, there remains a need for improved velocity estimation techniques and apparatus by which improved accuracy and continuous velocity fields is provided with a small set of velocity field parameters to facilitate improved image processing for high ratio video compression and other applications.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

Methods and apparatus are disclosed for estimating velocity fields using an image sequence with three or more frames, in which a system of equations is solved which includes two or more displaced frame difference (DFD) equations by an iteration technique for solving velocities on node points. The inventor has appreciated that such an equation system is fully or over-constrained and does not require any additional smoothness constraints. In addition, the inventor has appreciated that the motion field estimation preferably crosses as many temporal frames as possible so that previous or subsequent frames can be reconstructed by motion-compensated prediction and interpolation techniques based on an initial reference frame. The disclosed techniques employ a fully or over-constrained system based on at least three frames, in which the velocity field at a fixed pixel point can be solved using two or more DFD equations, and is particularly suitable for video compression applications in which the motion of moving objects in a scene is conservative or near-conservative. Moreover, the methods and apparatus disclosed herein avoid the block boundary velocity field discontinuities found in conventional block matching algorithms, since the pixel velocity values within a given block are not assumed to be constant.

In accordance with one or more aspects of the disclosure, a method is provided for estimating a velocity field using an image sequence having more than two frames. The method includes providing a set of equations having an integer number M−1 displaced frame difference (DFD) equations, where M is greater than two, as well as receiving an input image sequence comprising at least M image frames. The individual image frames include multidimensional image data corresponding to pixel locations at M different times. The method further includes solving the equation set using a set of iteration equations and the image data to determine a velocity field describing velocity vectors at pixel locations at a reference time. In certain embodiments, the equation set is solved by evaluating derivatives with respect to directional variables in the iteration equations according to a bilinear function. In certain embodiments, moreover, a progressive relaxation approach is used in the iteration in which an initial block size "n" is set defining an initial value for the number of interpolation points in the x and y directions, and the block size is selectively reduced during the iteration to progressively relax an amount of over-constraint of the equation set.

In accordance with further aspects of the disclosure, a motion estimator apparatus is provided with at least one processor and a memory, where the memory stores a set of equations having two or more DFD equations. The processor receives an input image sequence that includes an integer number M image frames with multidimensional image data corresponding to pixel locations at corresponding times, where M is greater than two. The processor solves the equation set using the image frames to determine a velocity field describing velocity vectors at pixel locations at the initial time. In certain embodiments the processor solves the equation set by starting an iteration with an initial block size defining initial values for the number of interpolation points, and selectively reduces the block size during the iteration to progressively relax an amount of over-constraint of the equation set. In certain embodiments, the processor solves the equation set by evaluating derivatives with respect to directional variables in the iteration equations according to a bilinear velocity field modeling.

In accordance with further aspects of the disclosure, a computer readable medium is provided with computer executable instructions for performing the disclosed motion estimation methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings.

DETAILED DESCRIPTION OF THE DISCLOSURE

One or more embodiments or implementations are hereinafter described in conjunction with the drawings, where like reference numerals refer to like elements throughout, and where the various features are not necessarily drawn to scale.

Figure 1:
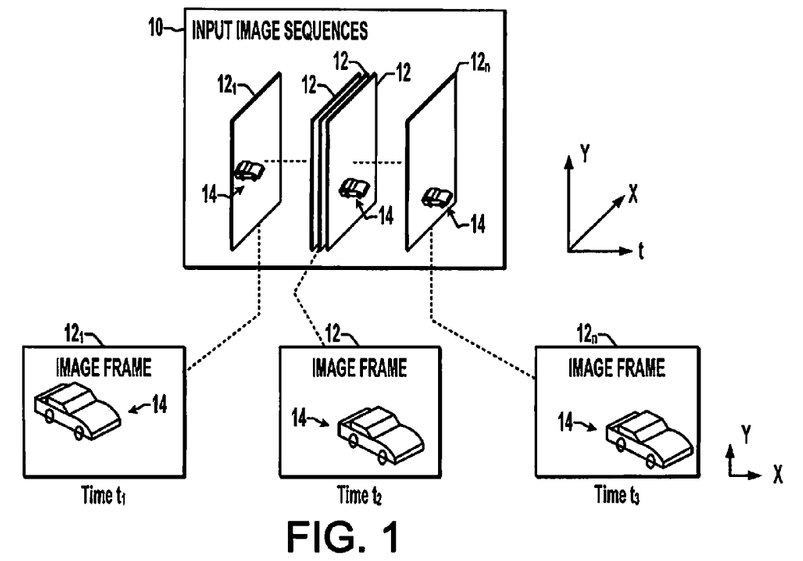
FIGS. 1 and 2 are schematic diagrams illustrating a multi-image input video sequence including two or more image frames and corresponding pixel data obtained at different times.
Figure 2:
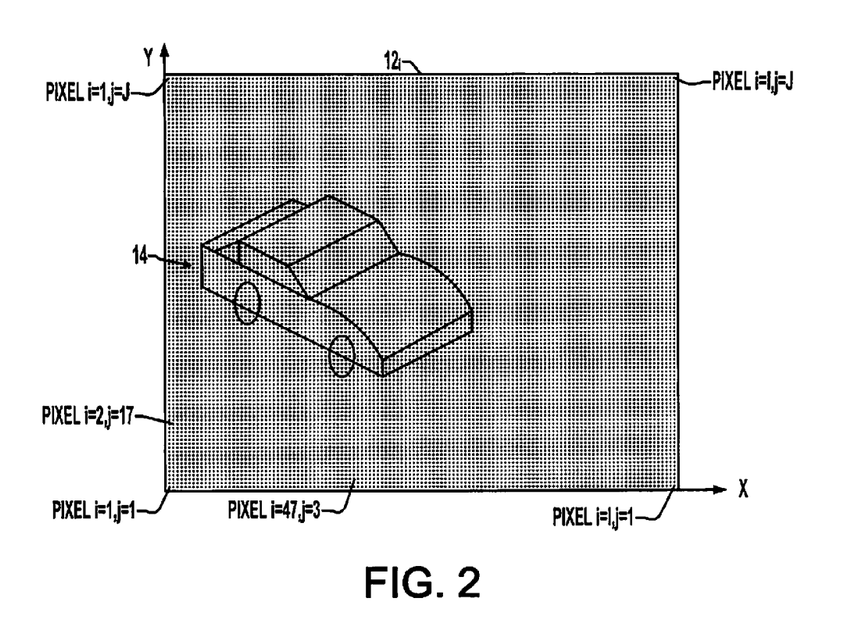

FIG. 1 illustrates an input image sequence 10 with a plurality of image frames 12 including a first image frame $12_1$, a final frame $12_n$, and one or more intervening frames 12 wherein the input sequence 10 can include any integer number of frames 12 that is greater than "M" and where M is an integer greater than 2. As seen in FIG. 2, each individual image frame $12_i$ includes an integer number of pixel data values, each corresponding to a two-dimensional pixel location (i, j) in an x-y plane, where each pixel location is indicated with an integer subscript index "i" indicating an x direction pixel index ($1 \leq i \leq I$) and an integer subscript index "j" indicating a y direction pixel index ($1 \leq j \leq J$). In the illustrated example, moreover, the image data represents optical (e.g., visible) data, such as video frames 12, where the input sequence 10 shows a vehicle artifact 14 moving toward a lower right corner of the image frame as the sequence proceeds from an initial (e.g., first) time $t_1$ (frame $12_1$) to a final time (e.g., $t_3$ for frame $12_n$). In practice, the individual image data for a given pixel location i, j can be a single value representing light intensity (luminance) and/or an individual data point may include luminance as well as color or chrominance data values (e.g., L*a*b*, RGB, CMYK data, etc.). In other embodiments, the image sequence 10 can include multidimensional image data representing "thermal" images, for instance, where the data values represent temperature, or other image sequences can be used in which the image intensity is recorded from physical sensors, for tracer, heat, or optical flow in space and time.

Figure 3:
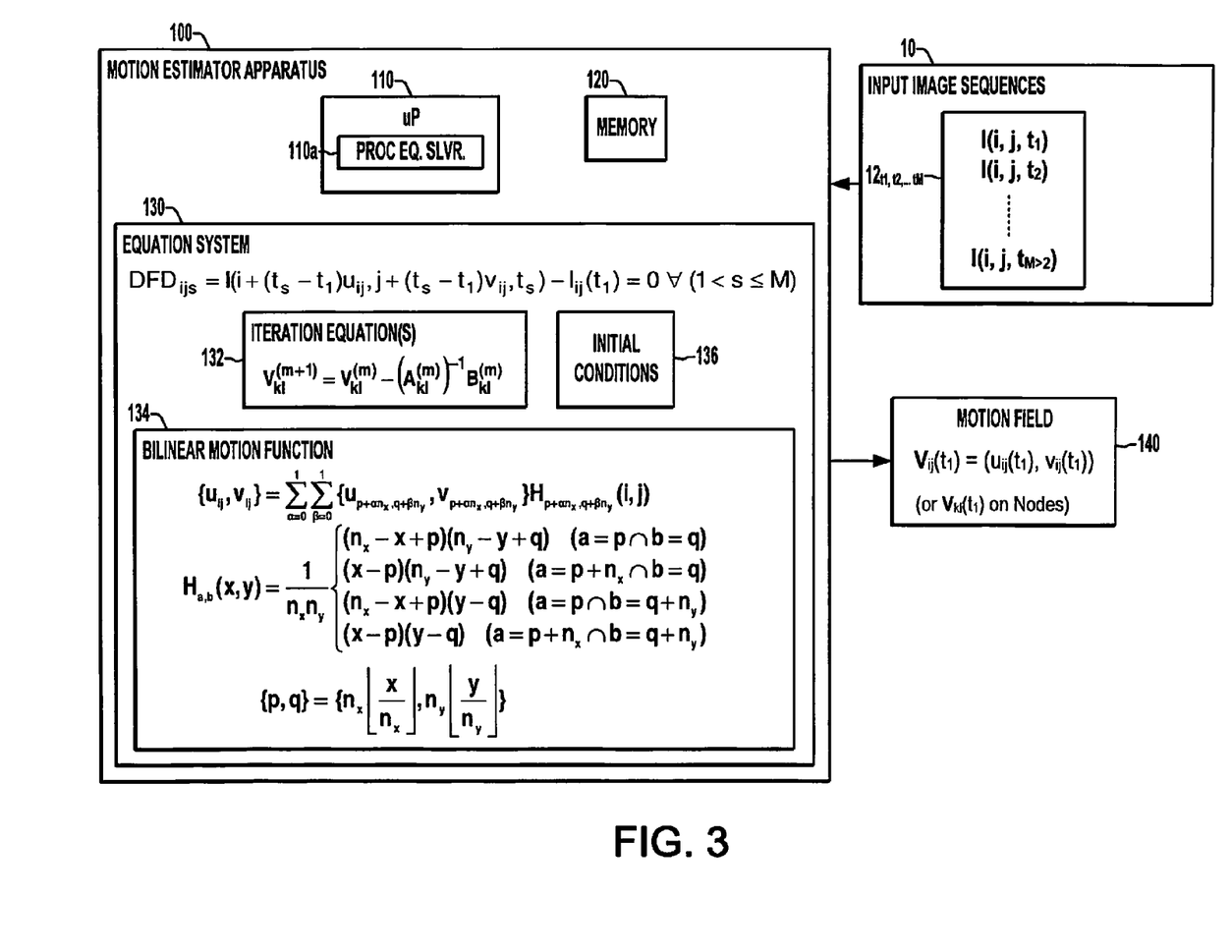
FIG. 3 is a schematic diagram illustrating an exemplary processor-implemented motion estimator apparatus for determining a velocity vector field from the input image sequence of FIGS. 1 and 2.

FIG. 3 illustrates an exemplary motion estimator apparatus 100 that can perform various image processing tasks including determining or estimating a velocity field 140 from an input image sequence 10 having a first image frame 12 including multidimensional image data corresponding to a plurality of pixel locations i, j at a first time $t_1$, as well as second and third image frames 12 including multidimensional image data corresponding to a plurality of pixel locations at corresponding second and third times $t_2$ and $t_3$. The apparatus 100 can be used to determine a velocity field 140 according to the disclosed techniques using any three or more image frames 12.

The apparatus 100 includes one or more processors 110 operatively coupled with a memory 120, and the apparatus 100 can be implemented in a single processing device or in distributed fashion across two or more processing elements 110. In the illustrated embodiment of FIG. 3, the processor 110 implements an equation solver 110a used for solving iteration equations 132 with a Progressive Relaxation of Over-Constraint (PROC) algorithm. In addition, the motion estimator apparatus 100 may form part of a larger system, such as a video processor coupled to a transmitter, a video camera, a frame rate up-converter, etc.

The estimator apparatus 100 receives the input image sequence 10 and generates a velocity vector field 140 which can be stored in the internal memory 120 and/or maybe outputted by the apparatus 100 alone or as part of a processed image sequence (not shown). In addition, the estimator apparatus 100 provides an equation system 130, which may be stored in the electronic memory 120. The illustrated estimator 100 further includes at least one iteration equation 132 and a bilinear motion vector function 134, which can be stored in the memory 120 or is otherwise be accessible for use by the processor 110 in performing the velocity field estimation functions set forth herein. In particular, the iteration equations 132 in certain embodiments are derived from the equation set 130 using a nonlinear least squares model and the bilinear displacement field modeling, as discussed further below. In addition, the bilinear motion vector function 134 in certain embodiments expresses a multidimensional velocity field.

The equation system 130 is a nonlinear set of M−1 displaced frame difference (DFD) equations, where two DFD equations can be used for multi-image sequences in which three image frames 12 are used in estimating the velocity field 140. In other embodiments, M can be greater than 3. For example, if M=4, three DFD equations can be used. The estimated velocity field 140 describes velocity vectors $v_{ij}(t_1)$ at pixel locations i, j at a reference time $t_1$, for example a velocity vector with two spatial components $u_{ij}(t_1)$ in a first (e.g., "x") direction and $v_{ij}(t_1)$ in a second (e.g., "y") spatial direction at the reference time. In the following discussion, it is assumed that the estimator apparatus 100 is used to estimate the velocity field vectors $v_{ij}(t_1)$ at time $t_1$ using frame data 12 from frames corresponding to the reference time $t_1$ as well as M−1 (e.g., two) other times $t_2$ and $t_3$ for cases where M=3. In addition, these same concepts apply where M is greater than 3.

In the illustrated example, the equation set 130 includes displaced frame difference equations ($DFD_{ijs}$), with one equation for each frame pair 12 used in estimating the velocity field 140, where DFD equations are provided for an integer number "s" frames where $1 \leq s \leq M$. In one embodiment shown in FIG. 3, the DFD equations are forward or backward (by reversing the frame order) DFD equations, although not a strict requirement of the disclosure. Using the image data from the M=3 received input frames 12 corresponding to times $t_1$, $t_2$ and $t_3$, the processor 110 is programmed to solve the equation set 130 to determine a velocity field describing velocity vectors $v_{ij}(t_1)$ at pixel locations i, j at $t_1$ using initial conditions 136 including known or estimated velocity field values at $t_1$. The inventor has appreciated that when M=3, the set of two DFD equations 130 has a total of two unknown variables for each pixel location i, j ($u_{ij}=u_{ij}(t_1)$, $v_{ij}=v_{ij}(t_1)$), and therefore the equation set 130 is fully constrained without approximation and without imposition of any additional constraints or assumptions.

In certain embodiments, the PROC equation solver 110a is implemented using the processor 110 in order to solve the DFD equations 130 using an iterative numerical technique to determine the velocity field 140, and may employ any suitable initial conditions 136 and loop termination logic, including without limitation a maximum number of iterations per pixel location i, j, or a maximum number of iterations per frame s, alone or in combination with termination based on computed cost function value changes being less than a predetermined threshold value (e.g., convergence conditions). The estimator apparatus 100 may provide the estimated velocity field 140 for use in a variety of applications, such as video processing using an interpolator to construct one or more additional frames for frame rate up-conversion. In another example, the estimator 100 may provide the velocity field 140 for use with compression processing in a video encoder for selectively dropping certain frames 12 received with the input image sequence 10. The velocity field 140 can be produced by the estimator apparatus 100, moreover, as either a full density field $V_{ij}(t_1)$ including velocity vectors for each pixel location i, j or a subset thereof (e.g., $V_{kl}(t_1)$) including velocity vectors only on nodes k, l since the off-node velocity vectors can be computed by the bilinear motion function 134 based on the estimated motion field $V_{kl}(t_1)$) on node points.

Figure 4A:
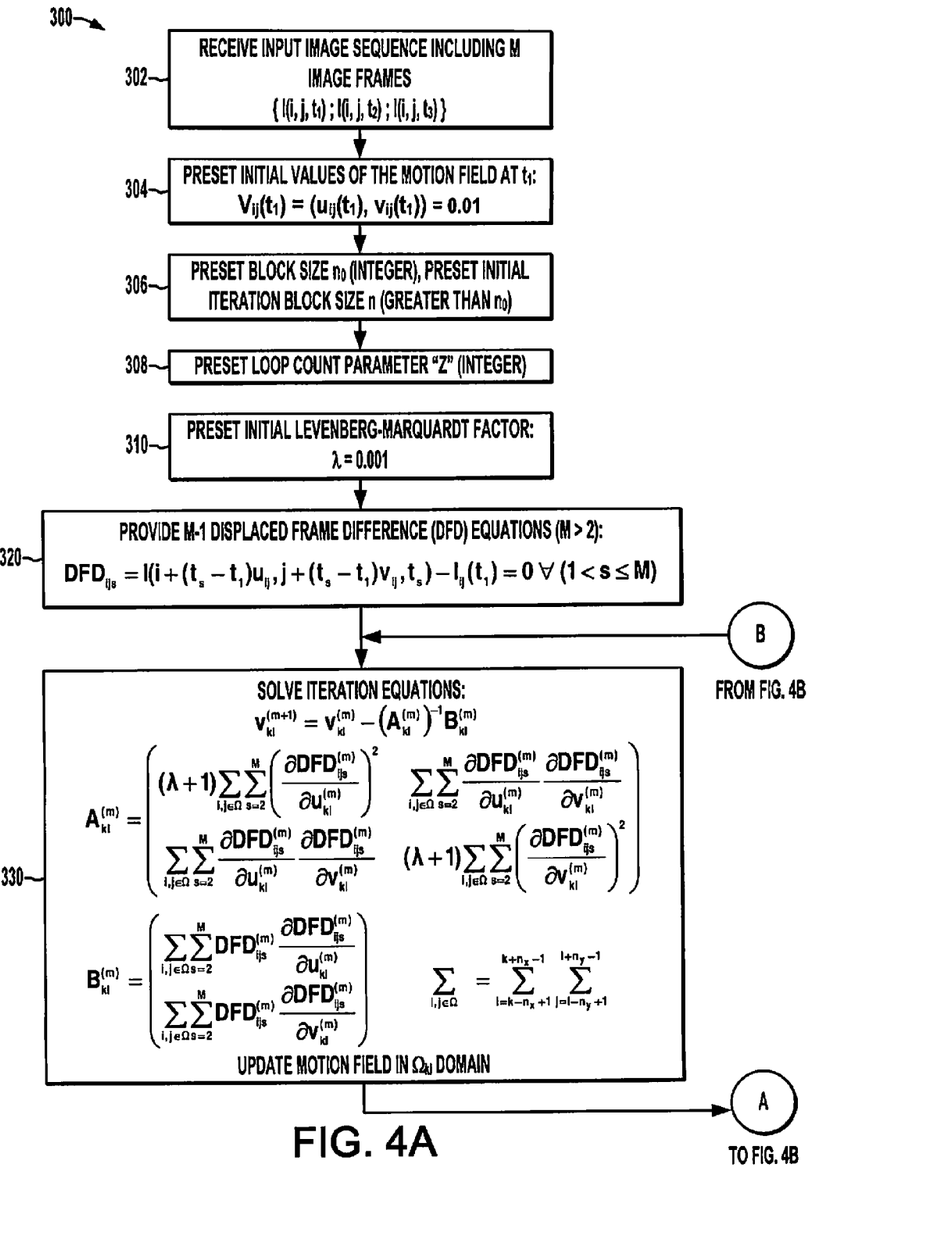
FIGS. 4A and 4B illustrate a flow diagram showing an exemplary velocity vector field estimation process in accordance with one or more aspects of the disclosure.
Figure 4B:
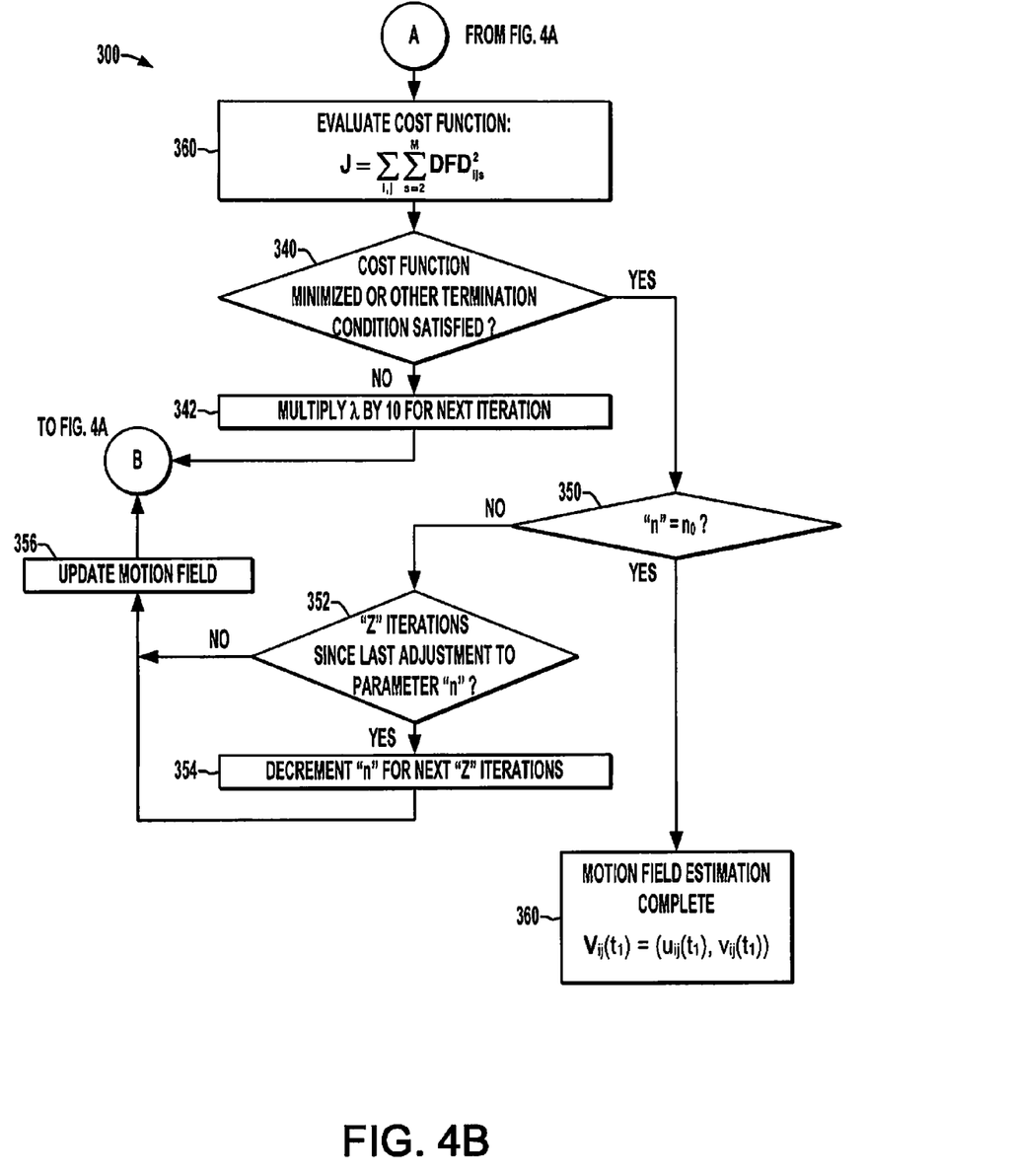

FIGS. 4A and 4B illustrate an exemplary method 300 for processing multi-image data from an input image sequence 10 in accordance with further aspects of the present disclosure. Although the method 300 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such illustrated acts may be combined or omitted. The illustrated method 300 may be implemented in hardware, processor-executed software, or combinations thereof, such as in the exemplary motion estimator apparatus 100 described above, and may be embodied in the form of computer executable instructions stored in a computer readable medium, such as in a memory 120 operatively associated with the processor 110 in one example.

Beginning at 302, an input image sequence 10 is received. The sequence 10 is a multi-image sequence including at least M image frames, where each frame 12 includes multidimensional image data corresponding to pixel locations (i, j) at M different times (e.g., $t_1$, $t_2$ and $t_3$). The method 300 also includes presetting initial values of the motion field at an initial reference time (e.g., $t_1$) at 304. In one possible implementation illustrated in FIG. 4A, seed values for the velocity vector components $u_{ij}(t_1)$ and $v_{ij}(t_1)$ are initialized at 304 to be 0.01 for each pixel location i, j, although this is one non-limiting example. A block size integer value ($n_0$) is preset at 306, which represents an integer number of pixels within an analysis block or tile of the images 12, and in certain embodiments sets the values for $n_x$ and $n_y$ to indicate the number of interpolation points on the orthogonal "x" and "y" directions of the image frames 12. In the example of FIG. 4A, any integer value can be used for presetting the block size $n_0$, such as 5 in one implementation. At 306, moreover, an initial iteration block size n is preset to an integer value that is greater than $n_0$. As discussed below, certain embodiments of the velocity field estimator apparatus 100 implement a progressive relaxation algorithm in which the block size "n" is selectively reduced during iteration to progressively relax an amount of over-constraint of the equation set 130. At 308 in FIG. 4A, a loop count parameter "Z" is preset to an integer value, such as 10 in one example. In addition, an initial Levenburg-Marquardt factor λ is preset at 310 for the iteration processing. In one example, this factor A is preset to 0.001, although other values can be used.

An integer number M−1 DFD equations are provided at 320, which may be stored in the estimator memory 120. In the illustrated embodiment, the DFD equations are of the following form:

$$DFD_{ijs} = l(i+(t_s-t_1)u_{ij}, j+(t_s-t_1)v_{ij}, t_s) - l_{ij}(t_1) = 0 \; \forall \; (1 < s \le M),$$ (1)

where l is an intensity of the image data, i is the pixel index in a first direction x, j is the y direction pixel index, s is a frame index, $t_s$ is a time corresponding to a currently indexed frame 12, $t_1$ is the first one of the M different times (the reference time for which the velocity field is being estimated), $u_{ij}$ is the x direction component of the velocity field 140, and $v_{ij}$ is the y direction velocity field component. Since the DFD equations (1) are indexed by the frame index "s", the set 130 includes an integer number M−1 of such equations. The inventor has appreciated that more than one DFD equation exists on a fixed pixel point from more than two successive frames 12, particularly where the motion of all moving objects in the scene is conservative or near conservative, and that these DFD equations (1) contain a unique conservative velocity field that crosses all the frames in such a conservative system. Thus, the DFD equations (1) express a temporal integral form of the optical flow conservative constraint, where $l_{ij}(t) = l(i, j, t)$, $u_{ij} = u_{ij}(t_1) = u(i, j, t_1)$ and $v_{ij} = v_{ij}(t_1) = v(i, j, t_1)$ are optical flow intensity, two components of conservative velocities on pixel points at time $t = t_1$, $s \in [2, \ldots, M]$, and M is the number of successive frames (>2). Moreover, since the number of the DFD equations (1) for all $s \in [2, \ldots, M]$ is equal to M−1, the system is fully constrained or over-constrained if M>2 for the conservative velocity field. Thereafter, the process 300 solves the equation set 130 using the iteration equations 132 and the image data of the received image frames 12 to determine the velocity field 140 describing velocity vectors $v_{ij}(t_1)$ at pixel locations (i, j) at time $t_1$.

At 330 in FIG. 4A, the velocities on node points are solved by the iteration equations 132 and the velocity field estimate $v_{ij}(t_1)$ is updated in the local domain $\Omega_{kl}$ (FIG. 6 below), after which the process 300 proceeds to 360 in FIG. 4B where a cost function is evaluated according to equation (3) below. A determination is made at 340 (FIG. 4B) as to whether the cost function is minimized or another termination condition is satisfied. If so (YES at 340), the process 300 proceeds to 350 where a determination is made as to whether the block size "n" is equal to the final block size value $n_0$ preset at 304 in FIG. 4A. If so (YES at 350), the motion field estimation is complete at 360.

If the cost function is not minimized and no other termination conditions are satisfied (NO at 340 in FIG. 4B), the Levenburg-Marquardt factor λ Is multiplied by 10 for the next iteration at 342, and the process 300 returns to again solve the iteration equations at 330 in FIG. 4A. This iterative algorithm continues as described above until the cost function (equation (3) below) is minimized or another termination condition is satisfied (YES at 340) and the block size "n" has not yet reached the preset value of $n_0$ (NO at 350). In this case, a determination is made at 352 as to whether the preset value "Z" iterations have occurred since the last adjustment to the block size parameter "n". If so (YES at 352), the block size "n" is decremented at 354, and the velocity field estimate $v_{ij}(t_1)$ is updated at 356, after which the process 300 returns to again solve the iteration equations at 330 in FIG. 4A. Otherwise (NO at 352 and FIG. 4B), the current block size value "n" is maintained, the velocity field estimate $v_{ij}(t_1)$ is updated at 356, and the process 300 returns to 330 in FIG. 4A for further iterations. In this manner, the process 300 provides an iterative approach for estimating the velocity field $v_{ij}(t_1) = \{u_{ij}(t_1), v_{ij}(t_1)\}$ at the reference time $t_1$ using the DFD equations and the iteration equations 132 in the system 130.

Figure 5:
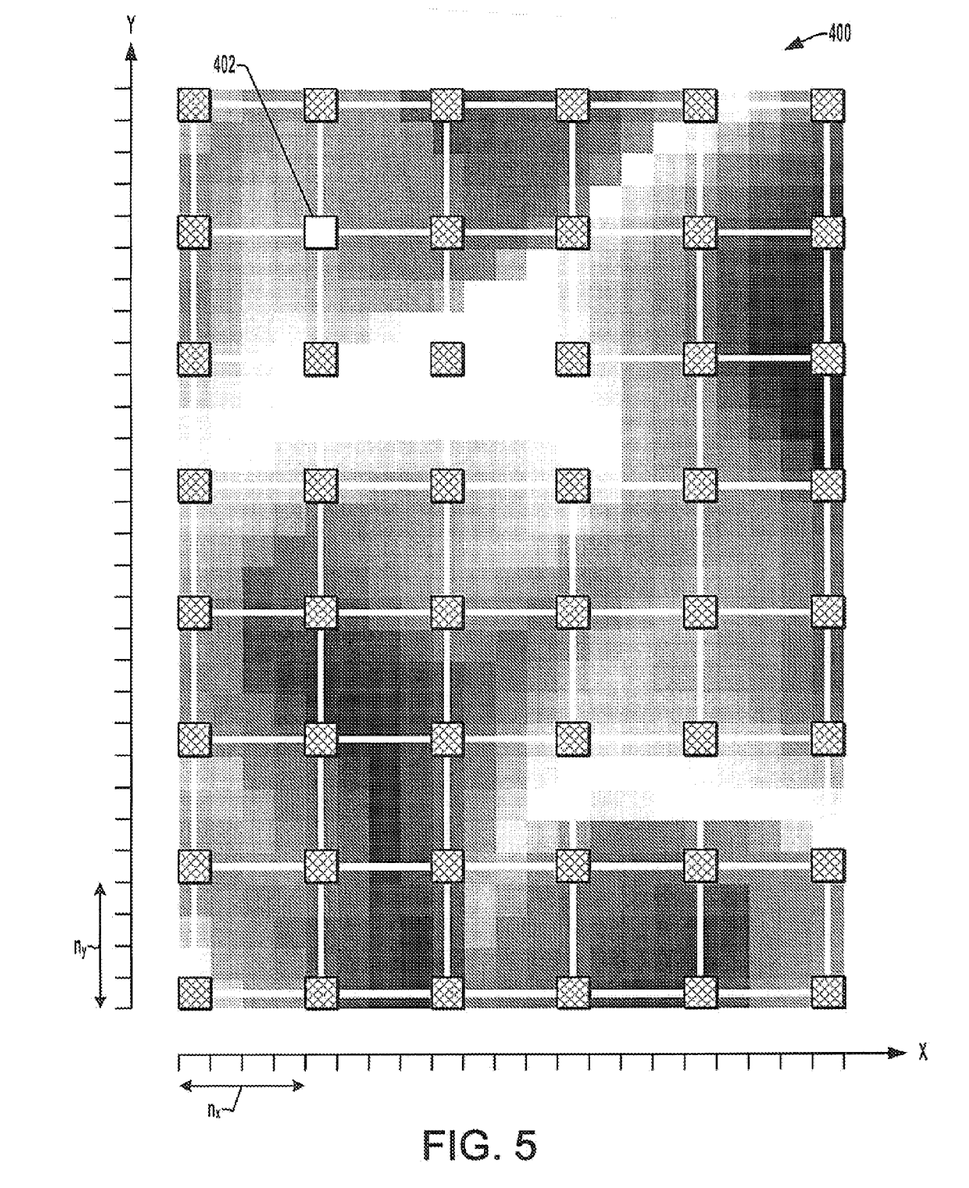
FIGS. 5 and 6 are schematic diagrams illustrating exemplary portions of an image frame partitioned into blocks or tiles.
Figure 6:
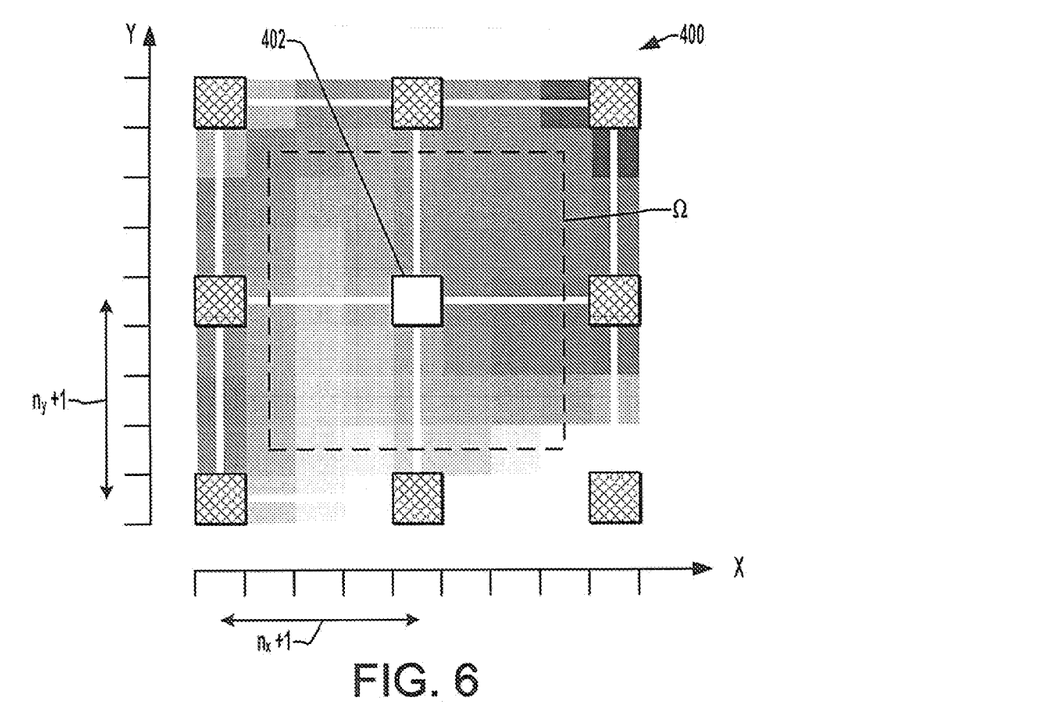

Referring also to FIGS. 5 and 6, an image 400 is shown in which exemplary portions of an image frame 12 are illustrated. As seen in FIG. 5, the pixel locations are partitioned into blocks or tiles with node points 402 at the corners of the blocks (node points 402 indicated as crosshatched or white squares in FIGS. 5 and 6). During the iterations of the process 300, the current value of the block size parameter "n" sets the number of interpolation points $n_x$ and $n_y$ on the "x" and "y" directions, respectively, and FIG. 6 illustrates the blocks in a local domain Ω proximate a particular node 402 in the image 400.

Figure 7:
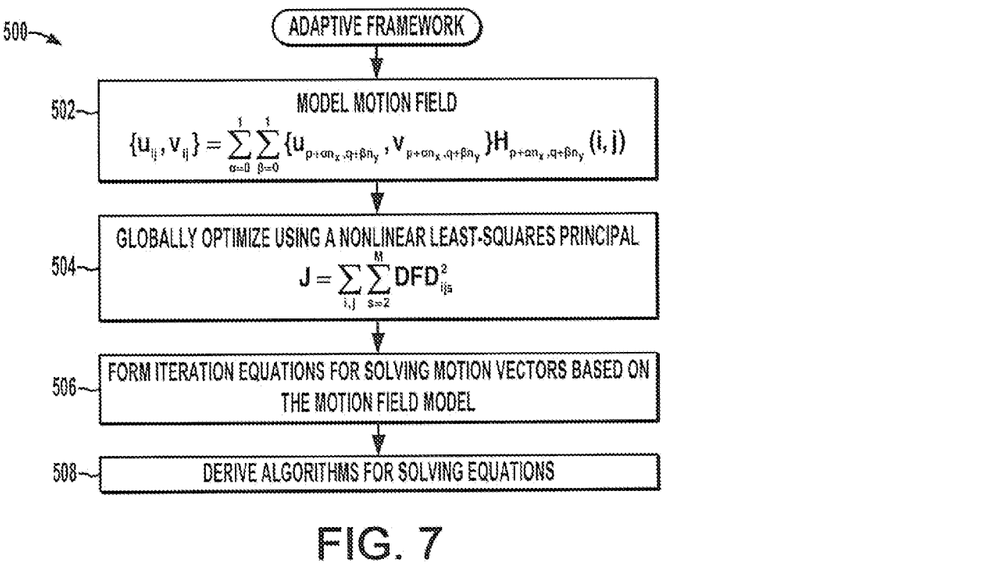
FIG. 7 is a flow diagram illustrating an exemplary adaptive framework for solving a system of equations in accordance with further aspects of the disclosure.

Referring also to FIG. 7, the velocity estimation apparatus 100 thus employs M−1 DFD equations in the set 130 along with the iteration equations 132 and the multi-image input sequences 10 to estimate the velocity field 140. The inventor has recognized that the DFD equations on all pixel locations is a nonlinear equation system 130, and since there may exist multiple local minimum solutions under lower degrees of over-constraint, a spatial velocity field modeling is employed in an adaptive framework 500 which selectively adjusts the degree of over-constraint from a higher degree over-constraint to a lower degree over-constraint by varying the block size parameter "n" for solving the nonlinear problem 130. In this regard, the above DFD equations (1) provide sufficient number of equations to solve the conservative velocity field if M>2, and a two-dimensional function can be expressed by a Lagrange bilinear polynomial as set forth in the following equation (2):

$$f(x, y) = \sum_{\alpha=0}^{1}\sum_{\beta=0}^{1} f(p + \alpha n_x, q + \beta n_y) H_{p+\alpha n_x, q+\beta n_y}(x, y), \quad (2)$$

where function $H_{a,b}(x, y)$ is defined by:

$$H_{a,b}(x, y) = \frac{1}{n_x n_y} \begin{cases} (n_x - x + p)(n_y - y + q) & (a = p \cap b = q) \\ (x - p)(n_y - y + q) & (a = p + n_x \cap b = q) \\ (n_x - x + p)(y - q) & (a = p \cap b = q + n_y) \\ (x - p)(y - q) & (a = p + n_x \cap b = q + n_y), \end{cases}$$

and where $n_x$ and $n_y$ are the number of interpolation points on the x and y directions. In addition, the quantized indices p and q on nodes are functions of x and y to implement a truncation function, and are given by the following equation:

$$\{p, q\} = \left\{ n_x \left\lfloor \frac{x}{n_x} \right\rfloor, n_y \left\lfloor \frac{y}{n_y} \right\rfloor \right\},$$

where $\lfloor\ \rfloor$ denotes an integer operator. In this regard, p will take on a value of 0 for $n_x$=0, 1, 2 and 3, and then will take on a value of 4 for $n_x$=4, 5, 6 and 7, etc. Similarly, q will take on a value of 0 for $n_y$=0, 1, 2 and 3, and a value of 4 for $n_y$=4, 5, 6 and 7, etc.

The two-component velocity field $v_{ij}(t_1) = \{u_{ij}(t_1), v_{ij}(t_1)\}$ on pixel points with horizontal and vertical coordinates x and y in an image can be expressed by the following bilinear polynomial functions (3) with first order continuity that holds for all $N_x \times N_y$ image globally:

$$\{u_{ij}, v_{ij}\} = \sum_{\alpha=0}^{1}\sum_{\beta=0}^{1} \{u_{p+\alpha n_x, q+\beta n_y}, v_{p+\alpha n_x, q+\beta n_y}\} H_{p+\alpha n_x, q+\beta n_y}(i, j). \quad (3)$$

All velocity off-node pixel locations (FIGS. 5 and 6) can be calculated by equation (3) using the velocity on node points 402 expressed as $u_{pq}$ and $v_{pq}$, where "k" is a node point index in the first direction x and "l" is a node point index in the second direction y. In this regard, the node point indexes k, l take values that are multiples of the block size during the iteration of the process 300. For instance, k can have values of 0, $n_x$, $2n_x$, $3n_x$, etc. and l similarly can have values of 0, $n_y$, $2n_y$, $3n_y$, . . . , etc.

In addition, the block size parameter "n" controls the degree of over-constraint of the equation system 130 according the following relationship $n_x = n_y = n \geq 1$ (M>2). Thus, all velocity vectors $v_{ij}$ in equation (3) are no longer independent variables for n>1 except on node points 402 and all independent velocities on nodes 402 are interrelated in the entire image scene 400 by equation (3). The number of interpolation points related to the resolution of the velocity field 140 and the degree of the over-constraint can be controlled during the iterative process 300 by adjusting the block size parameter $n \geq 1$, as seen at 352 and 354 of FIG. 4B above. The inventor has appreciated that when n=1, all node points and pixel positions are overlapped together and the system becomes a fully constrained (M=3) or over-constrained system (M>3). The degree of the over-determined DFD equations for the nonlinear least-squares approach can thus be controlled by the adjustable parameters $n_x$, $n_y$, and M.

As seen in FIG. 7, an adaptive framework 500 allows this problem to be solved, in which the velocity field 140 is modeled at 502 (equation (3) above). As part of the adaptive framework 500, moreover, the model is globally optimized at 504 using a nonlinear least squares approach reflected in the cost function. This model is then used to solve the over-constrained equation system 130 for the velocity field $u_{pq}$ and $v_{pq}$ on nodes 402 as optimized parameters. The cost function in this example is a sum of the total errors of the DFD equations (1) based on the least-squares principle, as seen in the following equation (4):

$$J = \sum_{i,j}\sum_{s=2}^{M} DFD_{ijs}^2, \quad (4)$$

where i and j are the pixel indices ranging over all pixels in an $N_x \times N_y$ image (i∈[0, $N_x$] and j∈[0, $N_y$]), s∈[2, . . . , M], and M>2. The inventor has appreciated that minimizing the cost function (4) for the indices k and l for all node points 402 in an image 400 yields the following independent system equations:

$$\sum_{i,j\in\Omega}\sum_{s=2}^{M} DFD_{ijs}\left\{\frac{\partial DFD_{ijs}}{\partial u_{kl}}, \frac{\partial DFD_{ijs}}{\partial v_{kl}}\right\} = 0,$$

where the summation denoted in above equations are given by $$\sum_{i,j\in\Omega} = \sum_{i=k-n_x+1}^{k+n_x-1}\sum_{j=l-n_y+1}^{l+n_y-1}.$$

To solve this nonlinear least-squares problem, a Gauss-Newton iteration technique is employed (e.g., FIGS. 4A and 4B above) using a Levenberg-Marquardt algorithm in order to improve convergence properties. In the illustrated embodiments, minimization of the cost function (4) for the indices k and I for all node points 402 in an image 400 at 506 in FIG. 7 yields the following iterative equations (5) for all indexes k and l:

$$v_{kl}^{(m+1)} = v_{kl}^{(m)} - (A_{kl}^{(m)})^{-1} B_{kl}^{(m)},$$

where $$A_{kl}^{(m)} = \begin{pmatrix} (\lambda+1) \sum_{i,j \in \Omega} \sum_{s=2}^{M} \left( \frac{\partial DFD_{ijs}^{(m)}}{\partial u_{kl}^{(m)}} \right)^2 & \sum_{i,j \in \Omega} \sum_{s=2}^{M} \frac{\partial DFD_{ijs}^{(m)}}{\partial u_{kl}^{(m)}} \frac{\partial DFD_{ijs}^{(m)}}{\partial v_{kl}^{(m)}} \\ \sum_{i,j \in \Omega} \sum_{s=2}^{M} \frac{\partial DFD_{ijs}^{(m)}}{\partial u_{kl}^{(m)}} \frac{\partial DFD_{ijs}^{(m)}}{\partial v_{kl}^{(m)}} & (\lambda+1) \sum_{i,j \in \Omega} \sum_{s=2}^{M} \left( \frac{\partial DFD_{ijs}^{(m)}}{\partial v_{kl}^{(m)}} \right)^2 \end{pmatrix},$$

and $$B_{kl}^{(m)} = \begin{pmatrix} \sum_{i,j \in \Omega} \sum_{s=2}^{M} DFD_{ijs}^{(m)} \frac{\partial DFD_{ijs}^{(m)}}{\partial u_{kl}^{(m)}} \\ \sum_{i,j \in \Omega} \sum_{s=2}^{M} DFD_{ijs}^{(m)} \frac{\partial DFD_{ijs}^{(m)}}{\partial v_{kl}^{(m)}} \end{pmatrix}.$$

At 508 in FIG. 7, algorithms are derived for solving the equations 130. In this regard, the Levenberg-Marquardt factor $\lambda \geq 0$ is adjusted at each iteration (e.g., 342 in FIG. 4B above) to guarantee that the cost function (4) is converging. The degree of over-constraint for the equation system 130 can therefore be controlled by the adjustable block size parameter $n \geq 1$ with this algorithm.

As seen in the exemplary embodiment of FIGS. 4A and 4B above, the process 300 starts from a set of preset initial values of the conservative velocity field (302) at time $t_1$. An iteration step based on the current conservative velocity field at time $t_1$ and the iterative of equation (5) is then performed by the estimator 100. In certain embodiments, the estimation employs a Gauss-Seidel type iteration algorithm using updated values of $u_{pq}^{(m)}$ and $v_{pq}^{(m)}$ on the right-hand side of equation (5) as soon as they become available during the iteration processing. Since many local minimum solutions may exist under lower degrees of the over-constrained equation set 130, an algorithm of progressive relaxation of over-constraint is also employed (adjustment of the block size at 350, 352, 354 and FIG. 4B above) in order to adapt a variable resolution of the velocity structure during the iterations. In the illustrated implementation, the block size parameter $n=n_0+10$ is selected as the initial value (higher degree of over-constraint) and it reaches a preset value of $n_0$ (e.g., 5) at the end (350 in FIG. 4B). This process regularizes the conservative velocity field by changing the parameter n from a larger value (higher degree of over-constraint) to a smaller one (lower degree of over-constraint) by one every ten iterations until it approaches the preset value of $n_0$, a technique referred to as an algorithm of progressive relaxation of over-constraint. Moreover, in the above implementation, all initial velocity field vectors are preset to 0.01, and the initial Levenberg-Marquardt factor $\lambda$ is set to 0.001 and is multiplied by ten in each step if the iteration is not converging, although not strict requirements of the present disclosure.

As noted above, conventional block matching algorithms (BMA) used for video compression utilize a block-based model to estimate a single motion vector for each block and assume that this philosophy vector is uniform within the block. The vector field estimated using this block-based model is not continuous. In contrast, however, the velocities on nodes 402 estimated by the above framework 500 are continuous and globally optimized, and all velocity vectors 140 on pixel points i, j can be changed and calculated by the modeled field function in equation (3). Using almost the same number of velocity vectors 140 in a fixed block size "$n_0$" for both approaches, the presently disclosed framework 500 can provide much higher accuracy performance than the block-based model. Application to systems in which most of the motions in an image scene are conservative or near conservative in a certain temporal interval with multi-image sequences results in a single conservative velocity field 140 in this temporal range that crosses several successive frames 12. The number of unknowns in this case (the two velocity components $u_{ij}$ and $v_{ij}$ at a fixed pixel point i, j) is equal to two. Since the number of DFD equations (1) is equal to M−1, the system 130 is fully constrained or over-constrained if M>2 for the conservative velocity field 140. The framework 500 of FIG. 7 with displaced frame difference (DFD) equations 130, spatial velocity modeling at 502, a nonlinear least-squares model at 504, and Gauss-Newton and Levenberg-Marquardt algorithms at 506 and 508 for solving the nonlinear system provides for improved velocity estimation in which all but one frame 12 of an input sequence 10 can be synthesized by motion compensated prediction and interpolation (MCI). Moreover, this framework 500 can estimate a large-scale motion field that crosses more than two successive frames 12, particularly where most motions in the scene in the temporal interval are conservative or near conservative.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (processor-executed processes, assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for estimating a velocity field using an image sequence having more than two frames, the method comprising:
    providing a set of equations including an integer number M−1 displaced frame difference equations, where M is greater than 2;
    receiving an input image sequence comprising at least M image frames individually including multidimensional image data corresponding to a plurality of pixel locations at M different times; and using at least one processor, solving the equation set using a set of iteration equations and the image data of the M image frames to determine a velocity field describing velocity vectors at pixel locations at a first one of the M different times, wherein the displaced frame difference equations are given by:

$$DFD_{ijs}=I(i+(t_s-t_1)u_{ij}, j+(t_s-t_1)v_{ij}, t_s)-I_{ij}(t_1)=0 \forall (1<s\leq M).$$

wherein I is an intensity of the image data, i is a pixel index in a first direction x, j is a pixel index in a second direction y orthogonal to the first direction x, s is a frame index, $t_s$ is a time corresponding to a currently indexed frame, $t_1$ is the first one of the M different times, $u_{ij}$ is a first component of the velocity field along the first direction x, and $v_{ij}$ is a second component of the velocity field along the second direction y.

2. The method of claim 1, wherein the iteration equations for solving the velocities on node points are given by:

$$V_{kl}^{(m+1)}=v_{kl}^{(m)}-(A_{kl}^{(m)})^{-1}B_{kl}^{(m)},$$

where:

$$v_{kl}^{(m+1)} = v_{kl}^{(m)} - (A_{kl}^{(m)})^{-1} B_{kl}^{(m)}, \text{ where:}$$

$$A_{kl}^{(m)} = \begin{pmatrix} (\lambda+1)\sum_{i,j\in\Omega}\sum_{s=2}^{M}\left(\frac{\partial DFD_{ijs}^{(m)}}{\partial u_{kl}^{(m)}}\right)^2 & \sum_{i,j\in\Omega}\sum_{s=2}^{M}\frac{\partial DFD_{ijs}^{(m)}}{\partial u_{kl}^{(m)}}\frac{\partial DFD_{ijs}^{(m)}}{\partial v_{kl}^{(m)}} \\ \sum_{i,j\in\Omega}\sum_{s=2}^{M}\frac{\partial DFD_{ijs}^{(m)}}{\partial u_{kl}^{(m)}}\frac{\partial DFD_{ijs}^{(m)}}{\partial v_{kl}^{(m)}} & (\lambda+1)\sum_{i,j\in\Omega}\sum_{s=2}^{M}\left(\frac{\partial DFD_{ijs}^{(m)}}{\partial v_{kl}^{(m)}}\right)^2 \end{pmatrix},$$

and $$B_{kl}^{(m)} = \begin{pmatrix} \sum_{i,j\in\Omega}\sum_{s=2}^{M} DFD_{ijs}^{(m)} \frac{\partial DFD_{ijs}^{(m)}}{\partial u_{kl}^{(m)}} \\ \sum_{i,j\in\Omega}\sum_{s=2}^{M} DFD_{ijs}^{(m)} \frac{\partial DFD_{ijs}^{(m)}}{\partial v_{kl}^{(m)}} \end{pmatrix}.$$

where the summation is given by:

$$\sum_{i,j\in\Omega} = \sum_{i=k-n_x+1}^{k+n_x-1}\sum_{j=l-n_y+1}^{l+n_y-1}, \text{ and}$$

where m is an iteration index, k is a node point index in the first direction x, l is a node point index in the second direction y, $\Omega$ is a local domain of pixel locations near a given node pixel location, $u_{kl}$ is a first component of the velocity field along the first direction x, $v_{kl}$ is a second component of the velocity field along the second direction y, and $\lambda$ is a Levenberg-Marquardt factor;

wherein solving the equation set comprises evaluating derivatives with respect variables $u_{ij}$ and $v_{ij}$ in the iteration equations by the following bilinear function:

$$\begin{cases} \frac{\partial DFD_{ijs}}{\partial u_{kl}} = (t_s-t_1)\frac{\partial u_{ij}}{\partial u_{kl}}\frac{\partial I(x, j+(t_s-t_1)v_{ij}, t_s)}{\partial x}\bigg|_{x=i+(t_s-t_1)u_{ij}} \\ \frac{\partial DFD_{ijs}}{\partial v_{kl}} = (t_s-t_1)\frac{\partial v_{ij}}{\partial v_{kl}}\frac{\partial I(i+(t_s-t_1)u_{ij}, y, t_s)}{\partial y}\bigg|_{y=j+(t_s-t_1)v_{ij}} \end{cases},$$

where $$\frac{\partial u_{ij}}{\partial u_{kl}} = \frac{\partial v_{ij}}{\partial v_{kl}} = \sum_{\alpha=0}^{1}\sum_{\beta=0}^{1} H_{k,l}(i, j)\delta_{k,p+\alpha n_x}\delta_{l,q+\beta n_y},$$

where $$H_{a,b}(x, y) = \frac{1}{n_x n_y}\begin{cases} (n_x-x+p)(n_y-y+q) & (a=p \cap b=q) \\ (x-p)(n_y-y+q) & (a=p+n_x \cap b=q) \\ (n_x-x+p)(y-q) & (a=p \cap b=q+n_y) \\ (x-p)(y-q) & (a=p+n_x \cap b=q+n_y), \end{cases}$$

where $n_x$ and $n_y$ are the number of interpolation points on the first and second directions, respectively; and wherein quantized indices on nodes are functions of x and y, and are given by:

$$\{p, q\} = \left\{n_x\left\lfloor\frac{x}{n_x}\right\rfloor, n_y\left\lfloor\frac{y}{n_y}\right\rfloor\right\},$$

where $\lfloor\ \rfloor$ denotes an integer operator.

3. The method of claim 2, wherein solving the equation set comprises:
   starting an iteration with an initial block size n defining initial values for the number of interpolation points $n_x$ and $n_y$ on the first and second directions, respectively; and
   selectively reducing the block size n during the iteration to progressively relax an amount of over-constraint of the equation set.

4. The method of claim 1, wherein solving the equation set comprises:
   iteratively solving the iteration equations for velocities on node points, with an initial block size n in the first direction x and the second direction y, each block being a region of pixels with a node point at each corner; and
   selectively reducing the block size n to progressively relax an amount of over-constraint of the equation set.

5. A motion estimator apparatus, comprising:
   at least one processor; and
   a memory storing a set of equations including an integer number M−1 displaced frame difference equations, where M is greater than 2;
   the at least one processor operative to receive an input image sequence comprising at least M image frames individually including multidimensional image data corresponding to a plurality of pixel locations at M different times; and
   the at least one processor operative to solve the equation set using a set of iteration equations and the image data of the M image frames to determine a velocity field describing velocity vectors at pixel locations at a first one of the M different times,
   wherein the displaced frame difference equations are given by:

$$DFD_{ijs}=I(i+(t_s-t_1)u_{ij}, j+(t_s-t_1)v_{ij}, t_s)-I_{ij}(t_1)=0 \forall (1<s\leq M); \text{ and}$$

wherein I is an intensity of the image data, i is a pixel index in a first direction x, j is a pixel index in a second direction y orthogonal to the first direction x, s is a frame index, $t_s$ is a time corresponding to a currently indexed frame, $t_1$ is the first one of the M different times, $u_{ij}$ is a first component of the velocity field along the first direction x, and $v_{ij}$ is a second component of the velocity field along the second direction y.

6. The motion estimator apparatus of claim 5, wherein the iteration equations are given by:

$$v_{kl}^{(m+1)} = v_{kl}^{(m)} - (A_{kl}^{(m)})^{-1} B_{kl}^{(m)}, \text{ where:}$$

$$A_{kl}^{(m)} = \begin{pmatrix} (\lambda+1)\sum_{i,j\in\Omega}\sum_{s=2}^{M}\left(\frac{\partial DFD_{ijs}^{(m)}}{\partial u_{kl}^{(m)}}\right)^2 & \sum_{i,j\in\Omega}\sum_{s=2}^{M}\frac{\partial DFD_{ijs}^{(m)}}{\partial u_{kl}^{(m)}}\frac{\partial DFD_{ijs}^{(m)}}{\partial v_{kl}^{(m)}} \\ \sum_{i,j\in\Omega}\sum_{s=2}^{M}\frac{\partial DFD_{ijs}^{(m)}}{\partial u_{kl}^{(m)}}\frac{\partial DFD_{ijs}^{(m)}}{\partial v_{kl}^{(m)}} & (\lambda+1)\sum_{i,j\in\Omega}\sum_{s=2}^{M}\left(\frac{\partial DFD_{ijs}^{(m)}}{\partial v_{kl}^{(m)}}\right)^2 \end{pmatrix},$$

and $$B_{kl}^{(m)} = \begin{pmatrix} \sum_{i,j\in\Omega}\sum_{s=2}^{M} DFD_{ijs}^{(m)} \frac{\partial DFD_{ijs}^{(m)}}{\partial u_{kl}^{(m)}} \\ \sum_{i,j\in\Omega}\sum_{s=2}^{M} DFD_{ijs}^{(m)} \frac{\partial DFD_{ijs}^{(m)}}{\partial v_{kl}^{(m)}} \end{pmatrix}.$$

where the summation is given by:

$$\sum_{i,j\in\Omega} = \sum_{i=k-n_x+1}^{k+n_x-1}\sum_{j=l-n_y+1}^{l+n_y-1}, \text{ and}$$

where m is an iteration index, k is a node point index in the first direction x, l is a node point index in the second direction y, $\Omega$ is a local domain of pixel locations near a given node pixel location, $u_{kl}$ is a first component of the velocity field along the first direction x, $v_{kl}$ is a second component of the velocity field along the second direction y, and $\lambda$ is a Levenberg-Marquardt factor;

wherein the at least one processor is operative to solve the equation set by evaluating derivatives with respect variables $u_{ij}$ and $v_{ij}$ in the iteration equations by the following bilinear function:

$$\begin{cases} \frac{\partial DFD_{ijs}}{\partial u_{kl}} = (t_s-t_1)\frac{\partial u_{ij}}{\partial u_{kl}}\frac{\partial I(x, j+(t_s-t_1)v_{ij}, t_s)}{\partial x}\bigg|_{x=i+(t_s-t_1)u_{ij}} \\ \frac{\partial DFD_{ijs}}{\partial v_{kl}} = (t_s-t_1)\frac{\partial v_{ij}}{\partial v_{kl}}\frac{\partial I(i+(t_s-t_1)u_{ij}, y, t_s)}{\partial y}\bigg|_{y=j+(t_s-t_1)v_{ij}} \end{cases},$$

where $$\frac{\partial u_{ij}}{\partial u_{kl}} = \frac{\partial v_{ij}}{\partial v_{kl}} = \sum_{\alpha=0}^{1}\sum_{\beta=0}^{1} H_{k,l}(i,j)\delta_{k,p+\alpha n_x}\delta_{l,q+\beta n_y},$$

where $$H_{a,b}(x,y) = \frac{1}{n_x n_y}\begin{cases} (n_x-x+p)(n_y-y+q) & (a=p\cap b=q) \\ (x-p)(n_y-y+q) & (a=p+n_x\cap b=q) \\ (n_x-x+p)(y-q) & (a=p\cap b=q+n_y) \\ (x-p)(y-q) & (a=p+n_x\cap b=q+n_y), \end{cases}$$

where $n_x$ and $n_y$ are the number of interpolation points on the first and second directions, respectively; and wherein quantized indices on nodes are functions of x and y, and are given by:

$$\{p, q\} = \left\{n_x\left\lfloor\frac{x}{n_x}\right\rfloor, n_y\left\lfloor\frac{y}{n_y}\right\rfloor\right\},$$

where $\lfloor\;\rfloor$ denotes an integer operator.

7. The motion estimator apparatus of claim 6, wherein the at least one processor is operative to solve the equation set by:
starting an iteration with an initial block size n defining initial values for the number of interpolation points $n_x$ and $n_y$ on the first and second directions, respectively; and
selectively reducing the block size n during the iteration to progressively relax an amount of over-constraint of the equation set.

8. The motion estimator apparatus of claim 5, wherein the at least one processor is operative to solve the equation set by:
iteratively solving the iteration equations for velocities on node points, with an initial block size n in the first direction x and the second direction y, each block being a region of pixels with a node point at each corner; and
selectively reducing the block size n during the iteration to progressively relax an amount of over-constraint of the equation set.

9. A non-transitory computer readable medium with computer executable instructions for:
providing a set of equations including an integer number M−1 displaced frame difference equations, where M is greater than 2;
receiving an input image sequence comprising at least M image frames individually including multidimensional image data corresponding to a plurality of pixel locations at M different times; and
using at least one processor, solving the equation set using a set of iteration equations and the image data of the M image frames to determine a velocity field describing velocity vectors at pixel locations at a first one of the M different times, wherein the displaced frame difference equations are given by:

$$DFD_{ijs}=I(i+(t_s-t_1)u_{ij}, j+(t_s-t_1)v_{ij}, t_s)-I_{ij}(t_1)=0 \forall$$
$$(1<s\leq M); \text{ and}$$

wherein I is an intensity of the image data, i is a pixel index in a first direction x, j is a pixel index in a second direction y orthogonal to the first direction x, s is a frame index, $t_s$ is a time corresponding to a currently indexed frame, $t_1$ is the first one of the M different times, $u_{ij}$ is a first component of the velocity field along the first direction acts, and $v_{ij}$ is a second component of the velocity field along the second direction y.

10. The non-transitory computer readable medium of claim 9, wherein the iteration equations are given by:

$$v_{kl}^{(m+1)} = v_{kl}^{(m)} - (A_{kl}^{(m)})^{-1} B_{kl}^{(m)}, \text{ where:}$$

$$A_{kl}^{(m)} = \begin{pmatrix} (\lambda+1)\sum_{i,j\in\Omega}\sum_{s=2}^{M}\left(\frac{\partial DFD_{ijs}^{(m)}}{\partial u_{kl}^{(m)}}\right)^2 & \sum_{i,j\in\Omega}\sum_{s=2}^{M}\frac{\partial DFD_{ijs}^{(m)}}{\partial u_{kl}^{(m)}}\frac{\partial DFD_{ijs}^{(m)}}{\partial v_{kl}^{(m)}} \\ \sum_{i,j\in\Omega}\sum_{s=2}^{M}\frac{\partial DFD_{ijs}^{(m)}}{\partial u_{kl}^{(m)}}\frac{\partial DFD_{ijs}^{(m)}}{\partial v_{kl}^{(m)}} & (\lambda+1)\sum_{i,j\in\Omega}\sum_{s=2}^{M}\left(\frac{\partial DFD_{ijs}^{(m)}}{\partial v_{kl}^{(m)}}\right)^2 \end{pmatrix},$$

and $$B_{kl}^{(m)} = \begin{pmatrix} \sum_{i,j\in\Omega}\sum_{s=2}^{M} DFD_{ijs}^{(m)} \frac{\partial DFD_{ijs}^{(m)}}{\partial u_{kl}^{(m)}} \\ \sum_{i,j\in\Omega}\sum_{s=2}^{M} DFD_{ijs}^{(m)} \frac{\partial DFD_{ijs}^{(m)}}{\partial v_{kl}^{(m)}} \end{pmatrix}.$$

where the summation is given by:

$$\sum_{i,j\in\Omega} = \sum_{i=k-n_x+1}^{k+n_x-1} \sum_{j=l-n_y+1}^{l+n_y-1}, \text{ and}$$

where m is an iteration index, k is a node point index in the first direction x, 1 is a node point index in the second direction y, Ω is a local domain of pixel locations near a given node pixel location, $u_{kl}$ is a first component of the velocity field along the first direction x, $v_{kl}$ is a second component of the velocity field along the second direction y, and λ is a Levenberg-Marquardt factor;

wherein the computer readable medium comprises computer executable instructions for evaluating derivatives with respect variables $u_{ij}$ and $v_{ij}$ in the iteration equations by the following bilinear function:

$$\begin{cases} \frac{\partial DFD_{ijs}}{\partial u_{kl}} = (t_s-t_1)\frac{\partial u_{ij}}{\partial u_{kl}}\frac{\partial l(x, j+(t_s-t_1)v_{ij}, t_s)}{\partial x}\bigg|_{x=i+(t_s-t_1)u_{ij}} \\ \frac{\partial DFD_{ijs}}{\partial v_{kl}} = (t_s-t_1)\frac{\partial v_{ij}}{\partial v_{kl}}\frac{\partial l(i+(t_s-t_1)u_{ij}, y, t_s)}{\partial y}\bigg|_{y=j+(t_s-t_1)v_{ij}} \end{cases},$$

where $$\frac{\partial u_{ij}}{\partial u_{kl}} = \frac{\partial v_{ij}}{\partial v_{kl}} = \sum_{\alpha=0}^{1}\sum_{\beta=0}^{1} H_{k,l}(i,j)\delta_{k,p+\alpha n_x}\delta_{l,q+\beta n_y},$$

where $$H_{a,b}(x,y) = \frac{1}{n_x n_y}\begin{cases} (n_x-x+p)(n_y-y+q) & (a=p \cap b=q) \\ (x-p)(n_y-y+q) & (a=p+n_x \cap b=q) \\ (n_x-x+p)(y-q) & (a=p \cap b=q+n_y) \\ (x-p)(y-q) & (a=p+n_x \cap b=q+n_y), \end{cases}$$

where $n_x$ and $n_y$ are the number of interpolation points on the first and second directions, respectively; and wherein quantized indices on nodes are functions of x and y, and are given by:

$$\{p,q\} = \left\{n_x\left\lfloor\frac{x}{n_x}\right\rfloor, n_y\left\lfloor\frac{y}{n_y}\right\rfloor\right\},$$

where $\lfloor\ \rfloor$ denotes an integer operator.

11. The non-transitory computer readable medium of claim 10, comprising computer executable instructions for:

starting an iteration with an initial block size n defining initial values for the number of interpolation points $n_x$ and $n_y$ on the first and second directions, respectively; and selectively reducing the block size n during the iteration to progressively relax an amount of over-constraint of the equation set.

12. The non-transitory computer readable medium of claim 9, comprising computer executable instructions for:

iteratively solving the iteration equations for velocities on node points, with an initial block size n in the first direction x and the second direction y, each block being a region of pixels with a node point at each corner; and selectively reducing the block size n during the iteration to progressively relax an amount of over-constraint of the equation set.

* * * * *